July 6, 1943.   R. N. SLINGER   2,323,427
REGULATOR
Filed Nov. 25, 1941
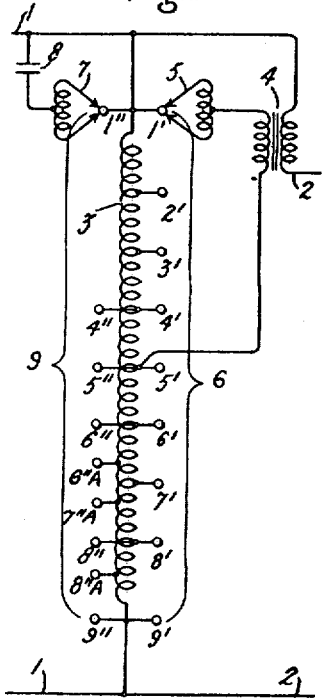
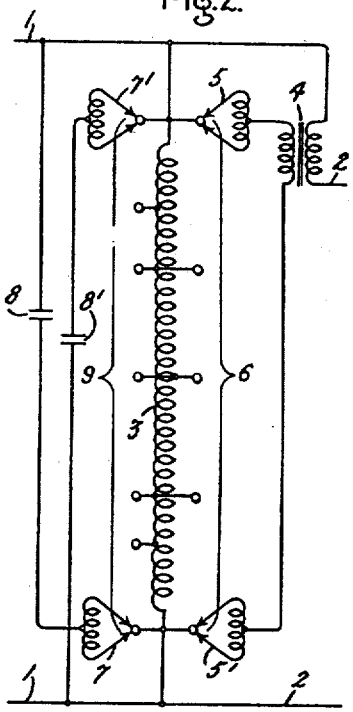
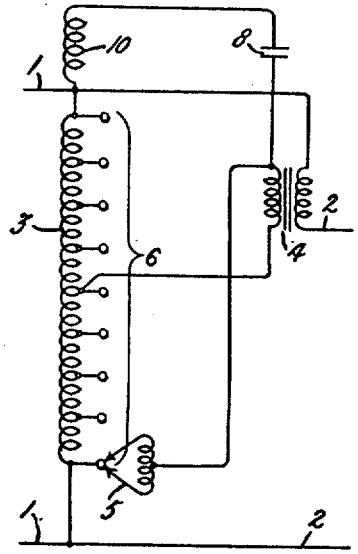
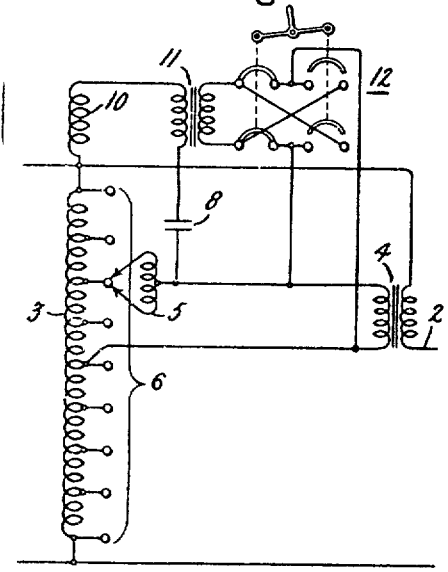
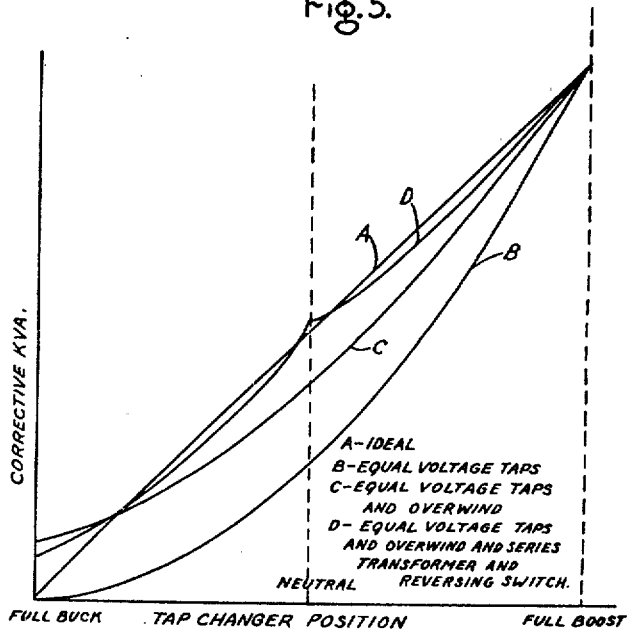
Inventor:
Robert N. Slinger,
by Harry E. Dunham
His Attorney.

Patented July 6, 1943

2,323,427

UNITED STATES PATENT OFFICE 2,323,427

REGULATOR

Robert N. Slinger, Glendale, Mo., assignor to General Electric Company, a corporation of New York Application November 25, 1941, Serial No. 420,375

25 Claims. (Cl. 171—119)

This invention relates to electrical regulators and more particularly to improvements in voltage regulators of the transformer tap-changing-under-load type.

In regulators of this type the voltage is usually varied in equal steps. One reason for this is that there are practical limitations on the maximum coarseness of the voltage steps that can be tolerated. There are also limitations from a manufacturing standpoint on the maximum number of voltage steps. Therefore, in order that such a regulator may have the maximum working range possible with a given number of steps, these steps should be uniform.

In Patent No. 1,992,809, granted February 26, 1935, on an application of Louis F. Blume and assigned to the assignee of the present application, there is described and claimed a regulator of this type which is combined with a capacitor. The voltage across the capacitor is varied in steps by the transformer tap-changing means so that variable amounts of leading current will be taken by the capacitor. This leading current in flowing through the usual inductive reactance of the circuit whose voltage is to be regulated produces a voltage rise. In this manner the action of the capacitor supplements the action of the voltage regulator in regulating the voltage of the circuit. In addition, the leading current of the capacitor tends to improve the power factor of the regulated circuit.

One objection to the Blume circuit is that as the voltage across the capacitor is varied in approximately equal steps the corrective kva. introduced into the circuit is varied in unequal steps since the kva. of a capacitor is proportional to the square of the voltage across it. As the voltage correction produced by variations in capacitor kva. is substantially proportional to the variation in capacitor kva., it is desirable to have the capacitor kva. change in equal steps as does the direct voltage regulation produced by the ordinary tap-changing regulating transformer. This is particularly important in cases where the capacitor may be added to the equipment in any particular amount desired. For instance, the tap-changing regulating transformer might be installed with no capacitor initially and later as the load builds up and the demands on the regulator increase capacitor units could be added from time to time as needed.

In accordance with the present invention there is provided an arrangement which permits the corrective kva. of the reactive means, which is shown as a capacitor but which may also be a reactor, to be varied in approximately equal steps. In addition to improving the regulating action of the equipment this also results in lower annual losses for the regulated circuit than if the corrective kva. were varied as a square function of the voltage.

An object of the invention is to provide a new and improved electrical regulator.

Another object of the invention is to provide a combined voltage and wattless current regulator in which the voltage buck and boost produced by the regulator and the reactive kva. variations produced by the regulator take place in substantially equal steps.

The invention will be better understood from the following description taken in connection with the accompanying drawing, and its scope will be pointed out in the appended claims.

In the drawing Fig. 1 illustrates diagrammatically an embodiment of the invention using separate sets of differently spaced taps for the direct voltage regulation and the reactive kva. regulation; Fig. 2 is a modification of Fig. 1 in which the required amount of reactive means is divided into equal sections and a different type of ratio adjuster is used; Fig. 3 is a further modification in which a single tap changer operates over a single set of equally spaced taps; Fig. 4 is a modification of Fig. 3 for causing the reactive kva. to be more nearly directly proportional to the tap changer position; and Fig. 5 is a set of curves for comparing the operation of Figs. 3 and 4 with an ideal regulator on the one hand and with an equal step regulator in which no auxiliary means were provided for causing the corrective reactive kva. to approach direct proportionality to the tap changer position.

Referring now to the drawing and more particularly to Fig. 1, there is shown therein an alternating-current supply circuit 1 and a load circuit 2 which are interconnected by means of a two-core type regulating transformer or transformer system. This regulating transformer comprises an exciting autotransformer 3 and a series transformer 4 whose secondary winding is connected in the load circuit 2 and whose primary winding is connected across variable amounts of the autotransformer winding by means of a suitable tap-changing-under-load means 5 which co-operates with a set 6 of equally spaced taps 1' to 9' inclusive brought out from the winding 3. As shown, one terminal of the primary winding of the series transformer is connected to the midtap 5' of the winding 3. The voltage regulator is considered as being in its maximum voltage bucking position. As the tap changer 5 is moved downwardly along the taps 6 to voltage impressed across the primary winding of the series transformer and hence the series regulating voltage introduced into the load circuit by the secondary winding of the series transformer will decrease in equal steps until it becomes zero when the tap changer 5 is in contact with the center tap 6'. Further downward movement of the tap changer 5 reverses the voltage of the series transformer and causes it to boost the supply circuit voltage.

Connected between the upper conductor of the supply circuit 1, as viewed in the drawing, and a second tap changer 7 is a reactive device which is shown by way of example as a capacitor 8. The tap changers 5 and 7 may either be independent ratio adjusters which are operated simultaneously or they may be separate sections of a dual ratio adjuster. In either case they may be considered as a single tap changing means. The tap changer 7 co-opeartes with a second set 9 of taps 1" to 9" inclusive which are not equally spaced but which are so spaced that the squares of their voltages form an approximate arithmetical progression. In other words, by skipping a few of the equally spaced taps and adding a few additional taps it is possible to obtain approximately the desired straight line characteristic. This is indicated in the following table.

| Adjuster position | Per cent volts | Per cent capacitor kva. | Desired per cent kva. |
|---|---|---|---|
| | | R. N. S. | |
| 1" | 0 | 0 | 0 |
| 4" | 37.5 | 14 | 12.5 |
| 5" | 50 | 25 | 25 |
| 6" | 62.5 | 39 | 37.5 |
| 6"A | 70.5 | 50 | 50 |
| 7"A | 79 | 62.5 | 62.5 |
| 8" | 87.5 | 76.5 | 75 |
| 8"A | 94 | 88 | 87.5 |
| 9" | 100 | 100 | 100 |

The adjusters are shown in positions 1' and 1". The voltages of the various taps of the set 9 are shown in the second column from the left of the above table. The next two columns show respectively the actual percentage of capacitive kva. obtained and the ideal capacitive kva. for absolutely equal steps. As will be seen, the two are very close together and in no instance differ by more than 1½%.

By operating the tap changers 5 and 7 coincidentally by any well-known means it will be seen that the regulating voltage inserted in the circuit by the series transformer 4 and the corrective kva. supplied to the circuit by means of the capacitor 8 will both vary in essentially R. N. S. equal steps and that furthermore as the bucking voltage progressively decreases to zero and then reverses and increases as a boosting voltage the capacitive kva. progressively increases so that the action of the two supplement each other in regulating the voltage of the load circuit 2.

In the above description no distinction has been made between the taps and the tap contacts. As shown in the drawing, the tap contacts associated with the taps 6 are equally spaced because the taps are equally spaced whereas the tap contacts associated with the set of taps 9 are unequally spaced because those taps are unequally spaced. In actual practice the two sets of tap contacts will usually be equally spaced so that, for example, when tap changer 5 goes from tap 1' to tap 2' the tap changer 7 will move exactly the same distance. In other words, the physical distance between the tap contacts associated with taps 1" and 4" will be the same as the distance between the tap contacts associated with taps 1' and 2' and this relationship will be maintained for all of the other tap contacts.

In Fig. 2 a different type tap-changing equipment is employed and the required amount of capacitive reactance is divided into two equal units. The reactor is shown in its maximum boost position and the primary winding of the series transformer is excited from the exciting transformer under the control of the tap changer 5 and an auxiliary tap changer 5', the two being operated simultaneously in opposite directions so as to approach each other until they both engage the mid-tap whereafter they pass each other and move apart. In this manner the regulating voltage goes from maximum boost to zero and then reverses and increases in equal steps up to a maximum bucking voltage. Each of the two capacitors 8 and 8' have their respective tap changers 7 and 7' which operate in the same manner as the tap changers 5 and 5'. As shown, they are in the positions of maximum voltage across their respective capacitors. As they are moved together these voltages decrease in unequal steps. By providing suitable unequal spacings of the taps for the tap changers 7 and 7' the changes in capacitive kva. may be made in substantially equal steps.

For example, when the tap changers 5 and 5' are simultaneously moved inwardly to their respective next adjacent tap contacts, the tap changers 7 and 7' will be similarly operated with respect to their co-operating sets of taps. This operation of the tap changers 5 and 5' corresponds to a decrease in the voltage boost of 50 per cent which in turn corresponds to a decrease in total regulating voltage of 25 per cent because the maximum buck and boost voltages are equal. If the next to the outermost taps in the set 9 to which the tap changers 7 and 7' have been moved are so located that they reduce the voltage on the respective capacitors 8 and 8' by approximately 13 per cent of their former value of 100 per cent, the resulting capacitive kva. of the capacitors will be approximately 75 per cent of its initial value or, in other words, the decrease has been 25 per cent which corresponds to the decrease in voltage produced by the direct voltage regulator. If now the tap changers 5 and 5' are moved so as to engage the center tap of the set 6 the direct voltage regulator will be in the middle of its range. The accompanying motion of the tap changers 7 and 7' will bring them into contact with the taps in the set 9 which are immediately adjacent to the center tap. These taps are so located that they reduce the voltage applied to the capacitors to approximately 70 per cent of its initial value of 100 per cent, thus resulting in a reduction of the capacitive kva. of approximately 50 per cent which corresponds in percentage to the reduction in regulator voltage. The next operation of the tap changers 5 and 5' will cause them to pass each other and engage the taps on opposite sides of the mid-tap. This causes a 50 per cent buck in regulator voltage. The corresponding motion of the tap changers 7 and 7' will be such that they both engage the center tap of the set 9. This applies 50 per cent voltage to the capacitors and therefor causes their capacitive kva. to be reduced to 25 per cent of its maximum value which corresponds in percentage to the regulator voltage. When the tap changers 5 and 5' are moved outwardly so as to engage the end taps the regulator will be in its maximum buck position corresponding to minimum voltage added to the circuit by the regulator. The corresponding movement of the tap changers 7 and 7' will be from the center tap to the respective end taps, thereby reducing the voltage of the capacitors to zero with the result that their kva. is zero.

In actual practice it will ordinarily be preferable to arrange the tap contacts of the two sets of contacts in such a manner that their physical spacings in each set are the same although, of course, the relative tap connections in the windings will be as shown in the drawing. In this manner the same operating mechanism may be used to drive all of the tap changers with the minimum complications.

In Fig. 3 the voltage regulating portion of the circuit is the same as in Fig. 1. However, the exciting transformer 3 has an overwound extension or auxiliary winding 10 and the capacitor 8 is connected between the tap changer 5 and the end of the auxiliary winding 10. In this manner movement of the tap changer 5 from tap to tap can be made to vary the voltage across the capacitor in successive steps which are such that the differences between their squares are approximately equal. Thus, for example, if the tap changer 5 moves from the bottom tap to the mid-tap the regulating voltage is cut in half or, in other words, goes from maximum boost to zero which is one-half of the maximum boost to maximum buck range. However, the capacitor voltage is not reduced by one-half because in addition to the voltage of the winding 3 the voltage of the winding 10 is also applied to the capacitor 8.

For example, if there were no overwind 10 the movement of the tap changer 5 from the maximum boost position shown to the mid position, while resulting in a 50 per cent reduction in the regulator voltage, would result in a 75 per cent reduction in the capacitor kva. If, however, the overwind has a voltage of say 50 per cent of the voltage of the winding 3, then the voltage on the capacitor will be reduced from 150 per cent to 100 per cent resulting in a reduction of capacitive kva. which is of the order of 50 per cent and therefore it is of the order of the reduction in regulator voltage.

In the modification shown in Fig. 4 the action of Fig. 3 is improved upon by the addition of an auxiliary series transformer 11 and a reversing switch 12. The primary winding of the auxiliary series transformer 11 is connected across the primary or exciting winding of the main series transformer 4 through the reversing switch 12. In this manner the voltage of the auxiliary series transformer 11 is proportional to the regulator voltage. The secondary winding of the auxiliary transformer 11 is connected in series with the capacitor 8 and the overwind 10. The reversing switch may be operated manually or it may be interlocked with the driving means for the tap changer 5. In either case it operates to change the polarity of the voltage of the auxiliary series transformer 11 whenever the tap changer 5 passes the mid-tap on the winding 3; that is to say, whenever the regulator goes from boost to buck or vice versa. The polarity of the auxiliary transformer is such that its voltage opposes the voltage of the overwind and the voltage of the portion of the winding 3 which is impressed on the capacitor circuit.

The effect of this is to increase the effectiveness of the voltage of the overwind when the tap changer is in its mid-position and progressively to decrease the effect of this voltage as the tap changer moves away from this mid or neutral position. Thus, if the overwind has a voltage of such value, when the tap changer 5 is on the mid-tap, that the capacitive kva. is 50 per cent of the value it has when the tap changer 5 is in its maximum boost position, the action of the auxiliary transformer 11 will be to reduce the effectiveness of the overwind in all other positions of the tap changer, thus causing the capacitor kva. to be more nearly directly proportional to the tap changer position.

This can be seen more clearly by reference to Fig. 5 wherein the straight line A represents the ideal linear relation between corrective kva. and tap changer position. Curve B shows the relation between these items when there is no overwind and no auxiliary transformer 11 and the capacitor voltage is changed in equal steps. This curve is parabolic in shape as the kva. is proportional to the square of the voltage and the voltage is directly proportional to the tap changer position with equally spaced taps. In other words, with the tap changer in the neutral position the corrective kva. is about 25 per cent of what it is with the tap changer in the full boost position. Curve C shows the effect of the overwind 10 alone and corresponds to the results produced by Fig. 3 except that the voltage of the overwind is more nearly 25 per cent of the voltage of the main winding 3 than it is 50 per cent as previously mentioned. This is necessary in order to prevent the existence of excessive kva. with the tap changer in its full buck position. If the overwind had a voltage of 50 per cent, then the kva. would be 25 per cent with the tap changer in its full buck position. However, with an overwind having a voltage of about 25 per cent the corrective kva. is about as far below the ideal with the tap changer in the neutral position as it is above the ideal with the tap changer in the full buck position. Curve D shows how the operation is modified by the auxiliary series transformer 11 and reversing switch 12. With this arrangement it is possible to have an overwind with a much higher voltage so that with the tap changer in the neutral position the corrective kva. can be approximately 50 per cent. With the tap changer in its full buck position the auxiliary winding is producing its maximum bucking voltage so that the resultant voltage on the capacitor is reduced to a relatively low value which, as can be seen from the curves, is less than the voltage in the case of the curve C arrangement corresponding to Fig. 3.

The winding 10 does not have to be wound on the same core with the main transformer winding 3 and it may equally well be a separate autotransformer connected so as to add its voltage to the voltage of the winding 3.

While circuit 1 has been referred to as the supply circuit and circuit 2 has been referred to as the load circuit, it will be understood that these designations may be reversed or, in other words, power may flow through the systems shown in the drawing in either direction.

While there have been shown and described particular embodiments of this invention, it will be obvious to those skilled in the art that various changes and modifications can be made therein without departing from the invention and, therefore, it is aimed in the appended claims to cover all such changes and modifications as fall within the true spirit and scope of the invention.

What I claim as new and desire to secure by Letters Patent of the United States, is:

1. In combination, a transformer system, tap-changing means for varying the voltage of one side of said transformer system in equal voltage steps, reactive means connected to introduce appreciable corrective wattless kva. into a circuit supplying current to said transformer, and means operated by said tap-changing means for varying said wattless kva. in substantially equal steps.

2. In combination, a supply circuit, a load circuit, transformer means interconnecting said circuits, tap-changing-under-load means for varying the voltage ratio of said transformer means in equal voltage steps, a capacitor connected to introduce appreciable corrective leading kva. into one of said circuits, and means including said tap-changing-under-load means for varying said leading kva. in substantially equal kva. steps.

3. In combination, an alternating-current circuit, a voltage regulating transformer connected therein, a reactive device, said transformer having a winding provided with a plurality of taps, tap-changing means for selectively engaging certain of said taps so as to vary the voltage of said circuit in equal voltage steps, and means operable coincidentally with the operation of said tap-changing means for selectively connecting said reactive means to certain of said taps so as to vary the kva. of said reactive means in substantially equal steps.

4. In combination, an alternating-current supply circuit, an alternating-current load circuit, voltage regulating transformer means for interconnecting said circuits, a capacitor, said transformer means having a winding provided with a plurality of taps, tap-changing-under-load means for selectively engaging certain of said taps so as to vary the voltage of said load circuit in equal voltage steps, and means operable coincidentally with the operation of said tap-changing-under-load means for selectively connecting said capacitor to certain of said taps so as to vary the kva. of said capacitor in substantially equal steps.

5. In combination, a transformer having a multi-tapped winding, tap-changing means co-operating therewith, a reactive device, and means including said tap-changing means for selectively connecting said reactive device across different portions of said winding, said means serving to apply across said capacitor successive voltages which are characterized by having a substantially common difference between their squares whereby the effective kva. of said reactive device is changed in equal steps.

6. In combination, an alternating-current supply circuit, an alternating-current load circuit, a transformer interconnecting said circuits and having a multi-tapped winding, tap-changing-under-load means co-operating with said taps, a capacitor, and means including said tap-changing-under-load means for selectively connecting said capacitor across different portions of said winding, said means serving to apply across said capacitor successive voltages which are characterized by having a substantially common difference between their squares whereby the effective kva. of said capacitor is changed in equal steps.

7. In combination, a transformer having a multi-tapped winding, tap-changing means for co-operating therewith, a reactive device, and means including said tap-changing means for selectively connecting said reactive device across different portions of said winding, said taps being so spaced that the difference between the squares of the successive voltages applied to said reactive device is substantially equal whereby step-by-step operation of said tap-changing means will vary the kva. of said reactive device in substantially equal steps.

8. In combination, an alternating-current supply circuit, an alternating-current load circuit, a transformer connected between said circuits, said transformer having a multi-tapped winding, tap-changing-under-load means co-operating with said taps, a capacitor, and means including said tap-changing-under-load means for selectively connecting said capacitor across different portions of said winding, said taps being so spaced that the difference between the squares of the successive voltages applied across said capacitor is substantially equal whereby step-by-step operation of said tap-changing-under-load means will vary the kva. of said capacitor in substantially equal steps.

9. In combination, a transformer including a winding provided with a plurality of equally spaced taps, means including a tap changer co-operating with said taps for varying the voltage of a circuit connected to said transformer in equal voltage steps, a reactive device, an auxiliary winding on said transformer, and means including said auxiliary winding, said tap changer and said equally spaced taps for varying the kva. of said reactive device in substantially equal steps.

10. In combination, an alternating-current supply circuit, an alternating-current load circuit, transformer means interconnecting said circuits and having a winding provided with a plurality of equally spaced taps, means including a tap changer co-operating with said taps for varying the voltage of said load circuit in equal voltage steps, a capacitor, an auxiliary winding on said transformer means, and means including said auxiliary winding, said tap changer and said equally spaced taps for varying the kva. of said capacitor in substantially equal steps.

11. In combination, a transformer having a winding provided with a set of equally spaced taps and a set of unequally spaced taps, means including tap-changing means co-operating with said set of equally spaced taps for varying the voltage of a circuit connected to said transformer, a reactive device, and tap-changing means co-operating with said set of unequally spaced taps for varying the voltage of said reactive device, the unequal spacing of said taps being such that the difference between the squares of successive voltages applied across said reactive device is substantially equal.

12. In combination, an alternating-current supply circuit, an alternating-current load circuit, transformer means interconnecting said circuits, said transformer means having a set of equally spaced winding taps and a set of unequally spaced winding taps, means including tap-changing-under-load means co-operating with said set of equally spaced taps for varying the voltage of said load circuit in equal voltage steps, a capacitor, and tap-changing-under-load means co-operating with said set of unequally spaced taps for varying the voltage of said capacitor, the unequal spacing of said taps being such that the difference between the squares of successive voltages applied across said capacitor are substantially equal.

13. In combination, a transformer having a winding provided with a plurality of taps, a pair of oppositely movable tap changers for successively engaging said taps in pairs which are located symmetrically with respect to a predetermined tap, and a pair of equal reactive devices, one of said devices being connected between one of said tap changers and a point on said winding, the other of said reactive devices being connected between the other of said tap changers and another point on said winding which is symmetrically located on the other side of said predetermined tap from the first-mentioned point.

14. The combination as in claim 13, in which said taps are so spaced that the difference between the squares of their successive voltages is substantially constant and in which said reactive devices are capacitors.

15. In combination, an alternating-current circuit, a transformer including a winding provided with a plurality of equally spaced taps connected to said circuit, tap-changing means for successively making connection to said taps, reactive means, and means including said tap-changing means for varying the kva. of said reactive means in substantially equal steps by connecting said reactive means successively to said equally spaced taps.

16. The combination as set forth in claim 15 in which said reactive means is a capacitor.

17. In combination, an alternating-current circuit, a transformer including a winding provided with a plurality of equally spaced taps connected to said circuit, tap-changing means for successively making connection to said taps, means controlled by said tap-changing means for varying the voltage of said circuit in equal steps, reactive means, and means including said tap-changing means for varying the kva. of said reactive means in substantially equal steps by connecting said capacitor successively to said equally spaced taps.

18. The combination as set forth in claim 17 in which said reactive means is a capacitor.

19. In combination, a transformer including a winding provided with a plurality of equally spaced taps, a tap changer for co-operation with said taps, a reactive device, an auxiliary voltage producing winding, and means including auxiliary winding, said tap changer and said equally spaced taps for varying the kva. of said reactive device in substantially equal steps.

20. In combination, an alternating current supply circuit, an alternating-current load circuit, transformer means interconnecting said circuits and having a winding provided with a plurality of equally spaced taps, a movable tap changer for making successive electrical connection to said taps, a capacitor, an auxiliary voltage producing winding, and means including said auxiliary winding, said tap changer and said equally spaced taps for varying the kva. of said capacitor in substantially equal steps.

21. In combination, an alternating-current circuit, a transformer winding connected across said circuit, said winding having a plurality of equally spaced taps for varying the kva. of said changer for making successive electrical connection to said taps, a series transformer having a secondary winding connected in said circuit and having a primary winding connected between said tap changer and said mid-tap whereby operation of said tap changer from one end tap to the other causes the voltage of said series transformer to go from a maximum in one direction through zero to a maximum in the other direction, a reactive device, an auxiliary voltage producing winding having a pair of terminals one of which is connected to said tapped winding, and means for connecting one terminal of said reactive means to the other terminal of said auxiliary winding and for connecting the remaining terminal of said reactive means to said tap changer whereby operation of said tap changer from one end of its range to the other varies the kva. of said reactive means from a maximum value in one direction to a minimum value in the same direction.

22. In combination, an alternating-current supply circuit, an alternating-current load circuit connected thereto, a transformer winding connected across both of said circuits at their place of interconnection, said transformer winding having a plurality of equally spaced taps, a series transformer having a secondary winding connected in said load circuit and having a primary winding one terminal of which is connected to said tap changer and the remaining terminal of which is permanently connected to an intermediate one of said taps whereby operation of said tap changer from one end of its range to the other causes the voltage of said series transformer to vary in equal steps from a maximum value in one direction through zero to a maximum value in the other direction, a capacitor, and an auxiliary voltage producing winding having a pair of terminals one of which is connected to a terminal of said tapped winding, said capacitor being connected between said tap changer and the remaining terminal of said auxiliary winding, the connections of said series transformer and auxiliary winding being such that when said tap changer is in the position for causing said series transformer to produce maximum voltage boost in said circuit the voltage across said capacitor will be a maximum.

23. In the combination as set forth in claim 21, means for inserting in the circuit of said reactive means a bucking voltage which is proportional in magnitude to the voltage of said series transformer.

24. The combination set forth in claim 21 in which the voltage of said auxiliary winding is such that when said tap changer makes connection to said mid-tap the kva. of said reactive means is one-half its maximum value, and means for inserting in circuit with said reactive means a bucking voltage which is proportional in magnitude to the voltage of said series transformer.

25. In the combination as set forth in claim 22, an auxiliary series transformer having a secondary winding connected in series with said capacitor and having a primary winding connected across the primary winding of the main series transformer, and a polarity reversing switch connected in circuit with the primary winding of said auxiliary series transformer for causing the voltage of the secondary winding thereof to oppose the voltage of said auxiliary voltage producing winding in all positions of said tap changer.

ROBERT N. SLINGER.

CERTIFICATE OF CORRECTION.

Patent No. 2,323,427.  July 6, 1943.

ROBERT N. SLINGER.

It is hereby certified that error appears in the printed specification of the above numbered patent requiring correction as follows: Page 2, first column, line 32-44, in the table, under the heading "Per cent capacitor kva."; and in line 60, before the word "equal" strike out the initials "R.N.S."; page 5, first column, line 73, claim 21, strike out "for varying the kva. of said" and insert instead --including a mid-tap, a tap--; and that the said Letters Patent should be read with this correction therein that the same may conform to the record of the case in the Patent Office.

Signed and sealed this 17th day of August, A. D. 1943.

(Seal)

Henry Van Arsdale,
Acting Commissioner of Patents.